UNITED STATES PATENT OFFICE.

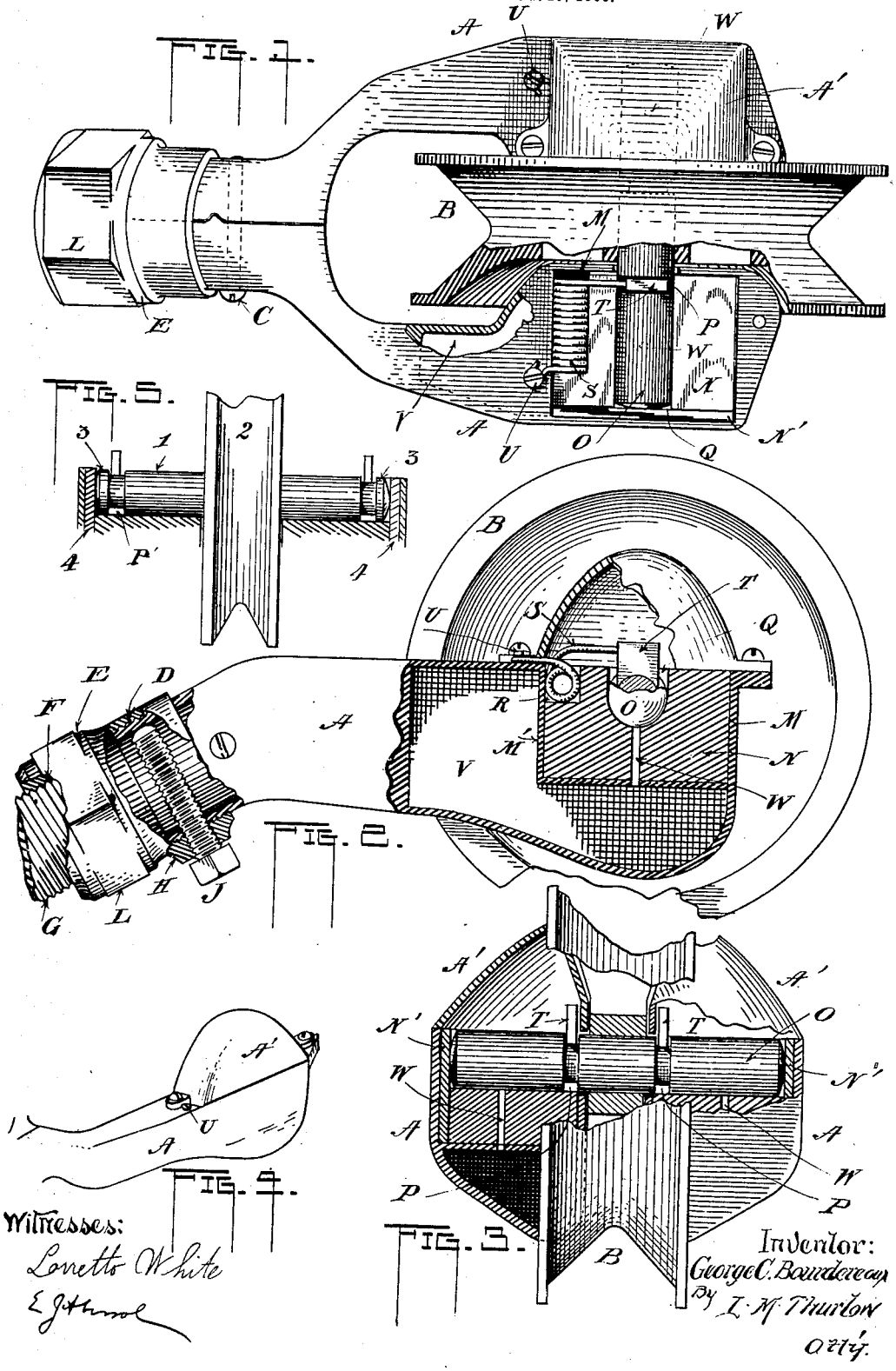

GEORGE C. BOURDEREAUX, OF PEORIA, ILLINOIS, ASSIGNOR, BY DIRECT AND MESNE ASSIGNMENTS, TO MELVIN W. SWARTZ, OF PEORIA, ILLINOIS.

TROLLEY-WHEEL.

No. 892,355.     Specification of Letters Patent.     Patented June 30, 1908.

Application filed August 29, 1906. Serial No. 332,423.

*To all whom it may concern:*

Be it known that I, GEORGE C. BOURDEREAUX, a citizen of the United States, residing at Peoria, in the county of Peoria and State of Illinois, have invented certain new and useful Improvements in Trolley-Wheels; and I do hereby declare that the following is a full, clear, and exact description of the invention, which will enable others skilled in the art to which it appertains to make and use the same.

This invention pertains to improvements in trolley wheels for electric cars.

The object of the invention is to produce a trolley wheel of a simple and cheap construction.

A further object of the invention is to provide a trolley fork in two sections suitably connected and which may be removed from the trolley arm without becoming separated.

A further object is to provide a new arrangement for securing the trolley fork to the trolley arm.

Another object of the invention is to provide a shaft of substantially the same diameter throughout for the trolley wheel and a long bearing for the same, and an improved contact brush therefor.

Another object is to provide a wooden bearing block for each extremity of the trolley wheel shaft and provide a long bearing for the latter, as an improvement over the device illustrated in my former patent on trolley wheels No. 524,017 of August 7, 1894.

Another object is to provide a trolley of a peculiar construction that will not catch on the trolley wire; the arms of the trolley being simplified in construction over that in the patent above mentioned.

In the appended drawing Figure 1 is a top view of the trolley wheel and fork. Fig. 2 is a side elevation of the same in part section showing the inner construction and a portion of the trolley arm. Fig. 3 is a rear view of a portion of the wheel and bearings, the latter and a portion of the fork being shown in transverse section. Fig. 4 is a perspective view, on a reduced scale, of one of the arms of the trolley fork. Fig. 5 is a face view of the trolley wheel showing a shaft of modified form and its bearings and a part of the fork in transverse section.

The device comprises two arms A A of the trolley fork each having an enlarged extremity which approach one another and between which the trolley wheel B is carried, the latter being recessed at each side to permit the said extremities to enter the same as shown. The rear extremities of the arms, which are in two portions, and as shown in Fig. 1, are held together by means of a screw C which may pass partially or entirely therethrough. The immediate extremities of the arms are provided with screw threads D, Fig. 2, to screw into a coupling E correspondingly threaded as shown in said figure. The opposite end of the coupling E is also threaded at F to receive the threaded end of the trolley arm G. A boss H on the forward end of the said coupling receives a set screw J which extends through said coupling and the extremity of the fork as shown bearing against the opposite wall of the said fork. This prevents the coupling becoming unscrewed from the fork, but evidently a short screw will answer the same purpose if it passes through the boss H and the wall of the arm. The coupling is provided with flat faces as at L, after the manner of a nut, for receiving a wrench by which the fork may be easily screwed upon or off of the trolley arm G mentioned. Heretofore it has been usually necessary to use a "Stilson" wrench to remove the trolley and fork from the arm and in order to simplify matters I have provided a coupling having the flat face described whereby an ordinary monkey-wrench will accomplish the desired purpose. The enlarged ends of the fork arm, as already described, are provided with an inner socket of rectangular form as indicated by M formed by a box M' cast with the arm, in which is seated a non-metallic bearing block N preferably of wood, the kind of wood being preferably what is known as osage, though, as a matter of fact, others may be employed.

The shaft of the trolley wheel is indicated by the letter O and is merely a length of steel shafting turned true and suitably secured in the wheel and provided at each side of the latter, quite close thereto, with an annular groove P by reducing the diameter of the shaft slightly.

The width of the bearing blocks N are such as to fill the entire width of the recess M except for a non-metallic member N' also seated in the recess against the outer wall of the arm said plate being preferably of hard fiber to receive the end thrust of the shaft, the ends of the latter being rounded to present a very small friction surface to bear against said member; the said blocks being provided with grooves Q to receive the said shaft as shown. There is also formed in the front end of the blocks N a notch R within which is seated a helical spring S one end of which arises from said recess and extends to a point above the groove P in the shaft, the extremity carrying a copper block to answer as a "brush". The opposite end of the spring is carried out of the recess and extends in the opposite direction and is suitably secured to the arm A, as for instance, by means of a binding screw or other device U. The spring when inserted is properly manipulated so that the end carrying the "brush" will produce considerable downward pressure to produce friction upon the smaller diameter of the shaft thus producing perfect contact for current carrying purposes and for holding the shaft, snugly into its bearings. Forward of and beneath the bearing block N, the arms are made hollow to produce the recess V for containing a lubricant such as oil of the proper consistency. In the bottom of the groove Q of each block N is bored hole W through which the oil can keep the shaft well lubricated. Placed upon the extremity of the arms A are caps A' to cover the shaft and all other parts, making them practically dust-proof. As shown in Fig. 3 the caps A' and the under surfaces of the arms A are sloped away from the wheel so that no flat surface will be presented to catch upon or against the trolley wire.

In Fig. 4 a perspective view of one of the arms is shown to make the form of the cap A' understood as well as the means of connecting it to the said arm.

In Fig. 5 a slightly modified form of the shaft is shown and it will be noted in this figure that the grooves are near the ends of the shaft leaving an enlargement or head 3 to bear against the fiber member thus illustrating that it is not the intention to be confined to the form shown in Fig. 3. In using the wooden blocks N and the members N' the device will run a long time with very little wear. In removing the wheel from the fork it is only necessary to lift the contact member T from the shaft, which will permit said shaft to be readily removed from the bearings. I prefer to make the shaft of a straight section as by this means it is only necessary to use ordinary material without any preparation other than to provide the grooves for the contact member or brush T such grooves serving to prevent the brushes T from playing back and forth along the shaft and also by having the brushes let into these grooves a better electrical contact is secured since they touch the shaft on three of their surfaces. In practical use the current is carried down to the car through the wheel B, its shaft, the brushes T and the springs S to the arms A and thence to the trolley arm.

Without confining myself to any particular structure in my device, I claim:

1. In a trolley, a trolley wheel recessed at its opposite sides, a fork of two portions having recessed extremities, a grooved non-metallic block seated in each extremity and extending into the recesses of the wheel, a cylindrical shaft for the wheel, the extremities of which lie in and fit the grooves of the said blocks, there being a groove in said shaft at each side of the wheel within the adjacent end of the groove of the blocks, and a current receiving member contacting with the shaft within each of the grooves of the latter, and a spring for holding said member in place and for conveying away the current from the wheel to the fork substantially as described.

2. In a trolley, a trolley wheel recessed at its opposite sides, a fork of two separable portions having recessed extremities extending into the recesses of the wheel, a non-metallic block seated in each recess of the fork, each said block being provided with a groove, a shaft fixed in the wheel and lying in the grooves, and having its ends rounded, members against which the rounded end of the shaft contacts for preventing end movement thereof, a conductor contacting with the shaft and having electrical connection with the fork for the purposes set forth.

3. In a trolley, a fork, non-metallic bearing blocks set in the extremities thereof, the same having grooves therein, a thrust plate of non-metallic substance also seated in the fork ends, a trolley wheel, a shaft therefor of substantially the same diameter throughout its length, a spring for keeping pressure upon the shaft at each side of the wheel for the purposes described, the ends of the shafts having slightly rounded ends to bear against said thrust plate.

4. A trolley wheel, a shaft therefor, an arm at each side of the wheel each constituting a bearing for the shaft, a thrust plate carried in each arm for receiving the end thrust of the shaft, said shaft adapted at its ends to bear only at its axial center against said plates.

5. In a trolley, a fork having hollow extremities, non-metallic blocks seated in each, each block having a groove therein in line with one another and of substantially the same diameter throughout, a wheel, a shaft therein also of substantially the same diameter throughout where it is seated within the blocks, the same having slightly rounded ends, a fiber thrust plate located at the ends of the groove to receive the thrust of the shaft, and a spring-held member contacting with and for keeping pressure upon the shaft, there being provision for holding the member from movement along the shaft.

6. In a trolley, a fork having hollow extremities, non-metallic blocks seated in each, each block having a groove therein one in line with the other and of the same diameter throughout, a wheel, a shaft therein also of the same diameter throughout, where it is seated within the blocks, the same having slightly rounded ends, a fiber thrust plate located at the ends of the groove to receive the thrust of the shaft, an annular groove in the shaft at each side of the wheel, and a spring-held member for keeping pressure upon the shaft within the groove.

7. In a trolley, a fork having hollow extremities for containing a lubricant, a non-metallic block seated in each extremity and having a groove therein to form a bearing, a wheel, a shaft therein of substantially the same diameter throughout seated in said groove, a non-metallic thrust plate also seated in the hollow extremity for receiving the thrust of the shaft ends and a spring carried in each extremity for maintaining pressure upon the shaft.

8. In a trolley a fork having non-metallic bearing blocks therein, a wheel, a shaft therefor of the same diameter throughout, a helical spring having one end secured to the fork, the other having a downward tendency for contacting with and holding the shaft in place and also for conducting current from the wheel and shaft to the fork.

9. In a trolley a fork having non-metallic bearing blocks therein, a wheel, a shaft therefor of the same diameter throughout, a helical spring having one end secured to the fork the other having a downward tendency for contacting with and holding the shaft in place and also for conducting current from the wheel and shaft to the fork, and caps for covering the shaft and bearings.

10. In a trolley, a trolley arm, a fork comprising two separable members, abutting at their rear ends, one having a notch and the other a corresponding projection for entering said notch, a screw for securing the members together, a member adapted to screw upon the connected abutting ends, a set screw for securing the member immovably to the fork, said member also adapted to screw upon the trolley arm substantially as set forth.

In testimony whereof I have affixed my signature, in presence of two witnesses.

GEORGE C. BOURDEREAUX.

Witnesses:
L. C. HINCKLE,
LUCY A. PADDEN.